US010593953B2

(12) United States Patent
Hass (10) Patent No.: US 10,593,953 B2
(45) Date of Patent: Mar. 17, 2020

(54) INTEGRATED ELECTRODE-ELECTROLYTE UNIT

(71) Applicant: MJ3 Industries LLC, Cataldo, ID (US)

(72) Inventor: Jamie Lynn Hass, Cataldo, ID (US)

(73) Assignee: MJ3 Industries LLC, Cataldo, ID (US)

( * ) Notice: Subject to any disclaimer, the term of this patent is extended or adjusted under 35 U.S.C. 154(b) by 199 days.

(21) Appl. No.: 15/667,518

(22) Filed: Aug. 2, 2017

(65) Prior Publication Data

US 2018/0040901 A1 Feb. 8, 2018

Related U.S. Application Data

(60) Provisional application No. 62/370,576, filed on Aug. 3, 2016.

(51) Int. Cl.
```
H01M 4/00      (2006.01)
H01M 4/70      (2006.01)
H01M 2/16      (2006.01)
H01M 4/66      (2006.01)
H01M 2/14      (2006.01)
H01M 4/04      (2006.01)
H01M 10/0525   (2010.01)
H01M 10/0563   (2010.01)
H01M 10/052    (2010.01)
```

(52) U.S. Cl.
CPC ............ *H01M 4/70* (2013.01); *H01M 2/145* (2013.01); *H01M 2/1613* (2013.01); *H01M 2/1673* (2013.01); *H01M 4/0404* (2013.01); *H01M 4/0421* (2013.01); *H01M 4/661* (2013.01); *H01M 4/667* (2013.01); *H01M 10/0525* (2013.01); *H01M 10/0563* (2013.01); *H01M 4/664* (2013.01); *H01M 10/052* (2013.01)

(58) Field of Classification Search
CPC ...... H01M 4/70; H01M 4/667; H01M 2/1673; H01M 2/1613; H01M 4/0421; H01M 4/661; H01M 4/0404; H01M 10/0563; H01M 10/0525; H01M 2/145; H01M 10/052; H01M 4/664
See application file for complete search history.

(56) References Cited

U.S. PATENT DOCUMENTS

2008/0192407 A1 8/2008 Lu et al.
2011/0165466 A1 7/2011 Zhamu et al.
(Continued)

OTHER PUBLICATIONS

PCT Search Report and Written Opinion dated Oct. 10, 2017 for PCT Application No. PCT/US17/45192, 10 pages.

*Primary Examiner* — Nicholas P D'Aniello
(74) *Attorney, Agent, or Firm* — Lee & Hayes, P.C.

(57) ABSTRACT

Presented herein is a device that integrates an electrode and the electrolyte of a battery and uses nanomaterial as a separator between the two electrodes. The device described herein is designed to be suitable for high-temperature applications in which the membranes of traditional batteries would melt or decompose. Such melting or decomposition can short-circuit the cell, pose safety risks, and accelerate reaching the end of the batteries' lifespan. Using the nanomaterial as the separator, rather than the membrane that is used in traditional batteries, increases thermal and structural stability and reduces the need for external thermal management systems. Methods of manufacture and use of the device are also presented.

20 Claims, 10 Drawing Sheets

(56) References Cited

U.S. PATENT DOCUMENTS

| | | |
|---|---|---|
| 2012/0313587 A1 | 12/2012 | Norton et al. |
| 2013/0143124 A1 | 6/2013 | Lee et al. |
| 2013/0157125 A1* | 6/2013 | Sachdev ............... H01M 4/134 |
| | | 429/211 |
| 2014/0315100 A1 | 10/2014 | Wang et al. |
| 2015/0380706 A1 | 12/2015 | Yu et al. |

* cited by examiner

INTEGRATED ELECTRODE-ELECTROLYTE UNIT

CROSS REFERENCE TO RELATED APPLICATIONS

This application claims priority to U.S. Provisional Patent Application No. 62/370,576, filed Aug. 3, 2016, titled "Integrated Electrode-Electrolyte Unit," the entire contents of which is incorporated herein by reference.

BACKGROUND

Typically, lithium-ion batteries ("LiBs") include a current collector, cathode, membrane, electrolyte, anode, and a second current collector. The use of the membrane in a conventional LiB makes conventional LiBs unsuitable for some applications or uses. One known problem with the use of a membrane in LiBs is that above 140-160° C., the membrane melts, and the melting can short-circuit the cell. In addition to the risk of melting the membrane, ambient temperatures outside the LiB operating temperature range can decrease a conventional LiBs' performance, accelerating their aging process, and exceeding the safety properties of cell materials. External thermal management systems must therefore be used in some systems that include conventional LiBs.

Additionally, because the membrane between the electrodes in a conventional LiB is separate from the electrodes, the membrane can suffer viscoelastic creep with repeated cycles. A membrane commonly used in LiBs is an insulative polypropylene-type polymer that is stretched until small pores are formed. The membrane's pores can shrink over time, which increases the resistance to the flow of ions across the membrane.

Another problem with conventional LiBs that include a membrane is that the membrane can be difficult to place between the electrodes, and when the outside battery casing is twisted over the battery components during assembly, damage can be done to the membrane. Also, typically, LiBs are made with a flammable electrolyte, which poses a safety risk because it can cause the LiB to explode.

There exists a need for lithium-ion battery technology that allows for increased thermal stability such that the LiBs have a wider range of temperatures in which they can operate. Specifically, a need exists for LiBs that can operate at higher temperatures than conventional LiBs operate. Increased thermal stability could eliminate the need for external thermal management systems for LiB battery packs. Eliminating the need for the external thermal management system would allow for more economical and streamlined battery packs. There is also a need for LiBs that have increased structural stability to allow the batteries to withstand compression forces and other such forces.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

This disclosure describes a device, methods of manufacture, and methods of use of a device, which, in at least one example, is an integrated unit that integrates an electrode and the electrolyte of a battery and uses nanomaterial as a separator between the electrode and another electrode, thus avoiding the use of a membrane as is used in traditional batteries.

At least one example of the integrated unit described herein includes a current collector, electrode, separator, and an electrolyte, in which a nanomaterial is grown off of the current collector and a liquid electrolyte is held electrostatically in place using the nanomaterial.

In at least one example, the nanomaterial is grown off the current collector for a long enough time to achieve a sufficient length to incorporate all the components of the integrated unit in a porous array. In at least one example, the nanomaterial is integrated as a continuous part in battery cell components including the current collector, electrode, separator, and electrolyte.

BRIEF DESCRIPTION OF THE DRAWINGS

The detailed description is described with reference to non-limiting and non-exhaustive embodiments shown in the accompanying figures. In the figures, the left-most digit(s) of a reference number identifies the figure in which the reference number first appears. The same reference numbers in different figures indicate similar or identical items.

DETAILED DESCRIPTION

Overview

This disclosure describes a device, methods of manufacture of the device, and methods of use of the device, which, in at least one example, is an integrated unit that integrates an electrode and the electrolyte of a battery and uses nanomaterial as a separator between the electrode and another electrode, thus avoiding the use of a membrane as is used in traditional batteries.

In this disclosure, a "cell" generates electrical energy from chemical reactions or facilitates chemical reactions through the introduction of electrical energy. A cell is made up of two half-cells, each half-cell comprising an electrode (one being a cathode and the other an anode), and electrolyte. As used herein, a "battery" is one or more cells connected together.

This disclosure describes integrated units, methods of the integrated units' manufacture, and methods of the integrated units' use that permit batteries such as lithium-ion batteries ("LiBs") to withstand significantly higher temperatures and significantly increased forces than conventional lithium-ion batteries.

LiBs are lightweight, rechargeable, energy-dense batteries. LiBs are found in numerous types of electronic devices such as personal electronics (e.g., computers, phones), electric tools and small machinery (e.g., drills, saws), medical equipment, electric drive vehicles ("EDVs") (e.g., golf carts), energy storage systems, aerospace applications, and so forth. Lithium-ion batteries are also used for night vision goggles, cameras, and electronic equipment onboard aircraft. Lithium ions in a LiB cell travel from a negative electrode (an anode) to a positive electrode (a cathode) during discharge, and in the opposite direction during charging.

Various examples of techniques for assembling complete cells that include the integrated units are described herein. The integrated unit is one component in the manufacture of a cell. In some examples, the integrated unit is used in a lithium ion manganese oxide ("LMO") cell in a LiB by coupling the integrated unit with an electrode (which is an anode if a cathode is included in the integrated unit, and which is a cathode if an anode is included in the integrated unit). LMO lithium-ion batteries commonly use a lithium mixture ($LiMn_2O_4$) as the cathode and graphite as the anode. In other examples, lithium-ion batteries, for primary or non-rechargeable batteries, use a porous carbon cathode and lithium thionyl chloride anode, or a carbon cathode and lithium sulfuryl chloride anode, or a poly carbon monofluoride cathode and a lithium anode. In other examples, anodes can be lithium/manganese dioxide. and. In some examples, rechargeable batteries include a $Li(NiMnCo)O_2$ cathode and a carbon anode, a $Li(NiCoAl)O_2$ cathode and a carbon anode, or a $LiCoO_2$ cathode and a carbon anode. Other non-lithium based batteries can include zinc carbon, alkaline-manganese dioxide, or nickel oxyhydroxide batteries.

In this disclosure, "nanomaterial" is a material with nanostructures that have at least one dimension less than 1 micron in size. In this disclosure, "2D" nanomaterial is defined as having nanostructures with two dimensions that measure less than 1 micron, but have a third dimension that is not limited in size. The nanomaterial is compressible and demonstrates a viscoelastic property. In this disclosure, "nanosprings" are nanostructures that are substantially curly or coiled, and "nanowires" are nanostructures that are substantially straight.

In this disclosure, "integrated unit" refers to a particular subset of battery components comprising a current collector, an electrode, a separator, and an electrolyte or conductive polymer, each having certain composition, and assembled in a particular way.

In at least one example of a device, a cathode is used as the electrode in the integrated unit. As used herein, a "cathode" is an electrode into which an outside circuit's electrons flow, and from which conventional current leaves a polarized electrical device. In some examples described herein, the cathode is a high-voltage cathode of lithium manganese oxide ($LiMn_2O_4$) spinel. In various examples described herein, the cathode has a thickness of approximately 0.5 microns to approximately 2,000 microns, or approximately 0.5 microns to approximately 500 microns.

Viscosity of LMO can vary. In at least one example, the LMO is in a paste form, such that the LMO can be "pressed" onto and around the nanosprings described herein. In at least one example, the electrode material is made as a slurry, and the dynamic viscosity of the electrode slurry is in a range from at least about 0.10 pascal-seconds (Pa·s) to at most about 200 Pa·s, such as from at least about 0.20 Pa·s to at most about 80 Pa·s, and/or from at least about 4.0 Pa·s to at most about 10 Pa·s.

In at least one example, the electrode is a cathode and the cathode material (such as LMO) is mixed with a binder in order to make a physical and electrical connection between the electrode, current collector, and separator. This binder is a conductive material that can act like a glue and is sticky until it dries. Examples of binders that can be used are polytetrafluoroethylene (Teflon) condensed liquid ("PTFE"), Styrene Butadiene Rubber ("SBR"), polyvinylidene fluoride ("PVDF"), acetylene black/PVDF, BM-400B (Zeon), POLYOX™ water-soluble polymers (DOW chemical), polyacrylic acid ("PAA"), WALOCEL™ CRT sodium carboxymethyl cellulose (DOW chemical), polyvinylpyrrolidone ("PVP"), carboxymethyl cellulose ("CMC"), and New Zeon binder.

In at least one example device, the current collector from which the nanosprings are grown can be made of a metal mesh. In some examples, the metal mesh can be aluminum. In some examples, the metal mesh can be copper, bronze, aluminum, tin, or zinc. In some other examples, the current collector can be made of metal fabric. In at least one example, the current collector is made from mesh wide enough to be able to be pushed or forced through the LMO material but narrow enough that when the nanosprings are grown a seal will form. In at least one example, the current collector thickness ranges from at least about 0.01 mm to at most about 0.50 mm, such as from at least about 0.02 mm to at most about 0.40 mm, and/or from at least about 0.05 mm to at most about 0.30 mm.

As used herein, a "separator" is defined as a permeable divider between a cell's anode and cathode with functions including, in some examples, keeping the two electrodes apart to prevent electrical short circuits and allowing the transport of ionic charge carriers that are needed to close the circuit during the passage of current in an electrochemical cell. The specific type of separator material can depend on the type of battery (e.g., dry, electrolyte liquid, electrolyte gel).

In at least one example, nanomaterial can be used as the separator. The nanomaterial adds mechanical strength and electric stability to separator properties. The nanomaterial is lightweight and contains substantial surface area. Nanopores are between the nanomaterial. The nanopores electrostatically hold the electrolyte in suspension. As used herein, the term "nanopores" refers to the spaces that form in between the nanowires or nanosprings.

In examples of integrated units as described herein, the separator comprises the nanomaterial and nanopores. Conventionally, the separator is instead a stretched, porous, insulative polypropylene-type polymer membrane. Commonly, a separator known in the art is thin, in one dimension, non-woven, and either porous or made of glass.

In at least one example described herein, the nanomaterial includes silica (silicon dioxide) or titanium dioxide that grows from a gold catalyst.

In some examples, a coating may be applied to the nanomaterial. In various examples, the coating can be applied immediately after the manufacture of the nanomaterial.

Nanomaterial is manufactured (grown) using a vapor liquid solid ("VLS") process. Nanomaterial can form into different shapes. As at least one example, the nanomaterial is 2D nanomaterial in the form of wire-like individual wires, fibers, or columns. For purposes of this disclosure, the 2D nanomaterials are insulative or non-conductive.

As another example, nanosprings (also referred to as nanofibers) are nanomaterial that is coiled, helical, or twisted individually or around multiple wires.

Figure 6:
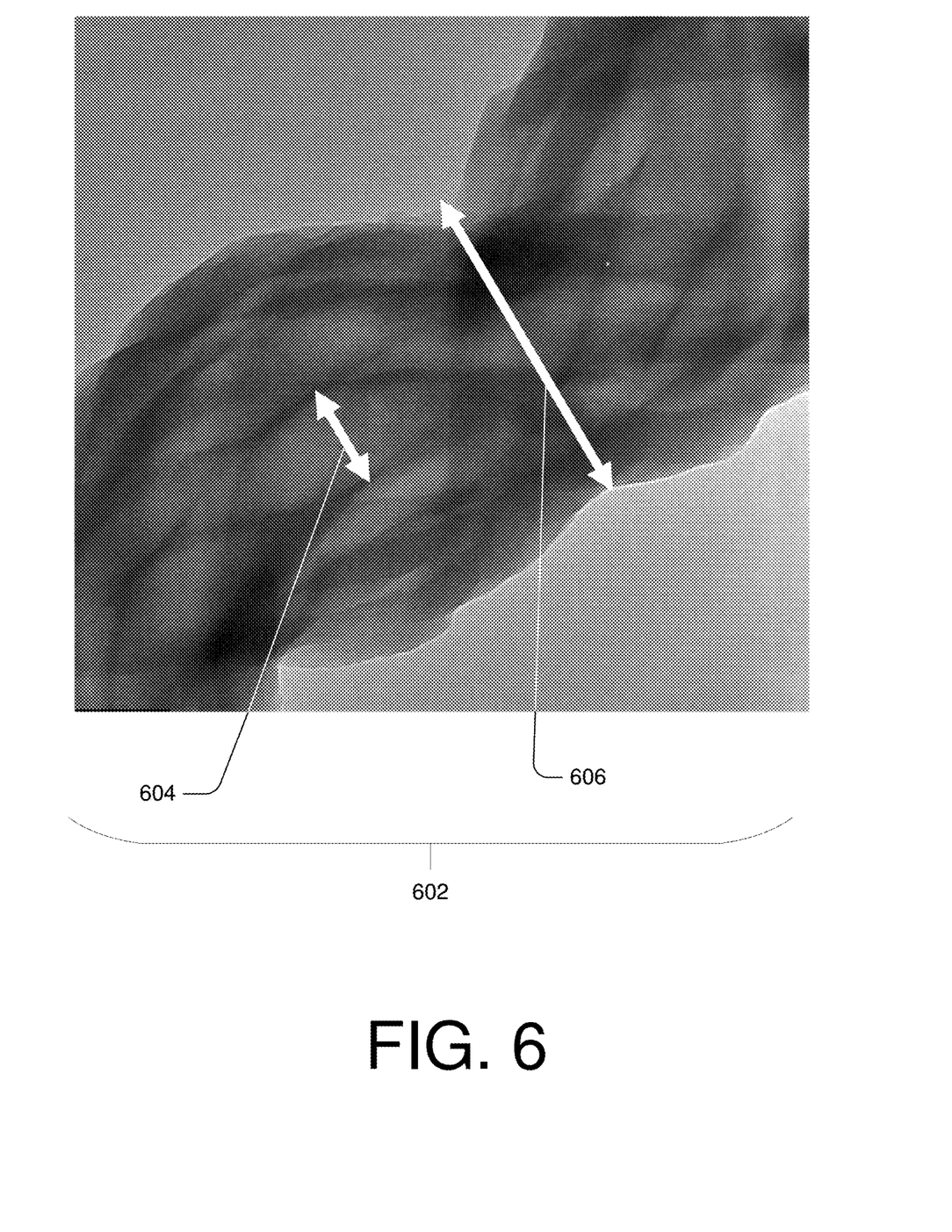
FIG. 6 is a high-magnification photograph showing the braided nanowires forming coils according to various examples described herein.

FIG. 6 is a high-magnification photograph showing the intertwining of nanowires into coils and nanosprings with a braided configuration according to various examples described herein. The width 602 of the entire photograph in FIG. 6 represents approximately 390 microns. FIG. 6 shows the width 604 of an individual nanowire. FIG. 6 also shows the width 606 of an individual nanospring.

Figure 7:
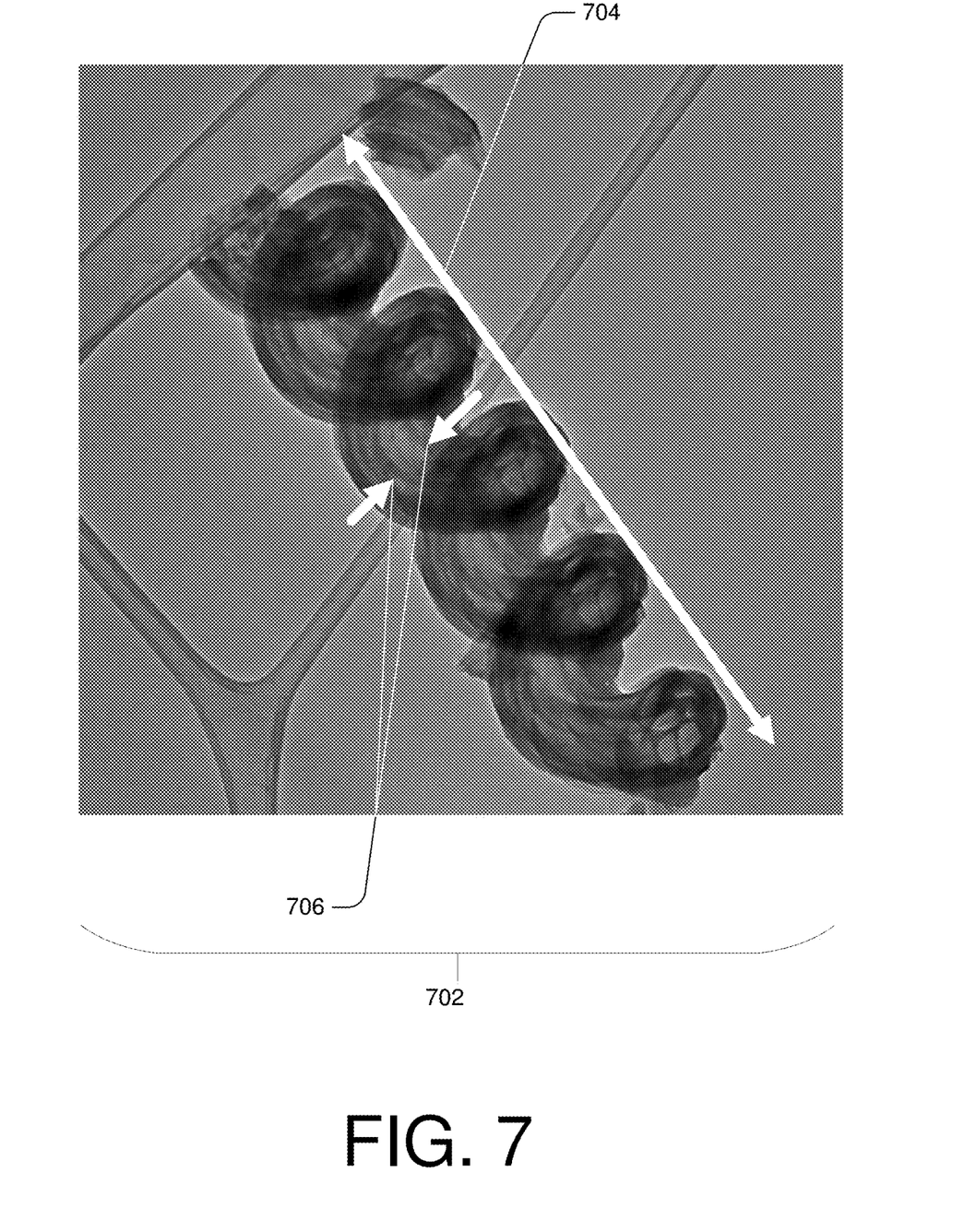
FIG. 7 is a photograph similar to FIG. 6, but at a higher magnification, showing braided nanowires forming coils according to various examples described herein.

FIG. 7 is a high-magnification photograph showing the braided nanowires forming a coil according to various examples described herein. The width 702 of the entire photograph in FIG. 7 represents approximately 1460 microns. FIG. 7 shows the length 704 of an individual nanospring. An individual nanowire is shown between the arrows 706.

In at least one example method of manufacture using the VLS process, the nanomaterial grows out of metal catalyst that is deposited on the current collector. In some example methods, the metal catalyst is a transitional metal, for example, zinc, gold, titanium, manganese, iron, copper, nickel, cobalt, or zirconium. In other example methods, the metal catalyst is a post-transitional metal, for example, tin, indium, gallium, bismuth, palladium, or aluminum. In some example methods, silicon dioxide or titanium dioxide or another metal alloy is the resultant nanomaterial grown from the catalyst. In some other example methods, a non-alloy metal can be the result of the VLS process dependent on the precursor gas used. The nanomaterials form a thin layer mesh connected to the current collector.

In at least one method, the resultant nanomaterial is then coated with a thin film of a polymer, such as polyvinylidene fluoride (PVdF), polyethylene oxide (PEO), polyacrylonitrile (PAN), or polymethylmethacrylate (PMMA). In some methods, the nanomaterial can be coated with a thin film of metal (e.g. gold nanoparticles), metal alloy (zinc oxide, titanium dioxide, etc.), and/or minerals.

In some examples, the separator comprises the nanosprings mat and the electrolyte but does not include the current collector.

In at least the first example, the integrated unit includes a separator scaffold. A separator scaffold is made of separate nanosprings (and/or nanofibers) interwoven together to form a porous structure—that is, it is made of the nanosprings and the nanopores between them. In at least one example, the separator scaffold includes the nanomaterial that is outside of the electrode material but does not include the current collector on which the nanomaterial is grown and does not include the part of the nanomaterial that is within the electrode layer. In other words, the separator scaffold is the portion of the integrated unit that is between the electrodes exposed to the electrolyte. In various examples, the separator scaffold thickness ranges between at least about 2 microns to at most about 30 microns.

Meanwhile, the nanosprings mat comprises the separator scaffold and also includes the nanosprings that are eventually covered by the electrode material. The nanosprings mat is the raw array that forms after growing nanosprings, before the addition of the electrode. In some examples, the pore size of the nanopores is at least about 0.10 microns to at most about 1.0 microns. In some examples, the nanosprings mat has approximately 200 nanopores per inch. In at least one example, the nanosprings mat is hydrophobic. In some examples, the nanosprings mat can be up to about 250 microns thick.

Figure 8:
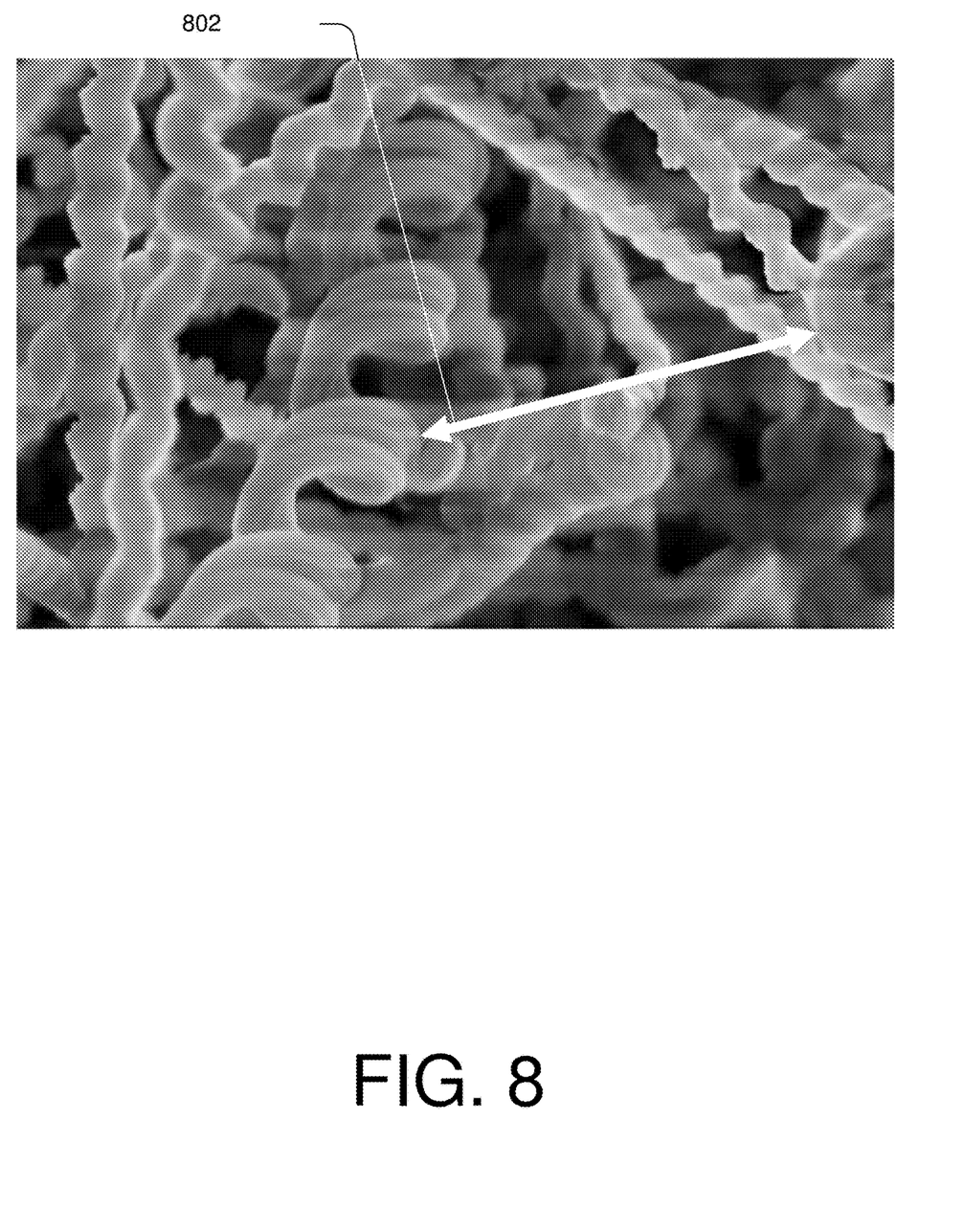
FIG. 8 is a high magnification photograph of the nanosprings mat showing nanopores between nanosprings, according to various examples described herein.

FIG. 8 is a high magnification of a nanosprings mat and nanopores between nanosprings according to various examples described herein. Arrow 802 in FIG. 8 represents 2.2 microns. Arrow 804 points to nanosprings at the nanosprings' outer surface, and the space between the arrows (that is, the space between the nanosprings) are the nanopores.

Figure 9:
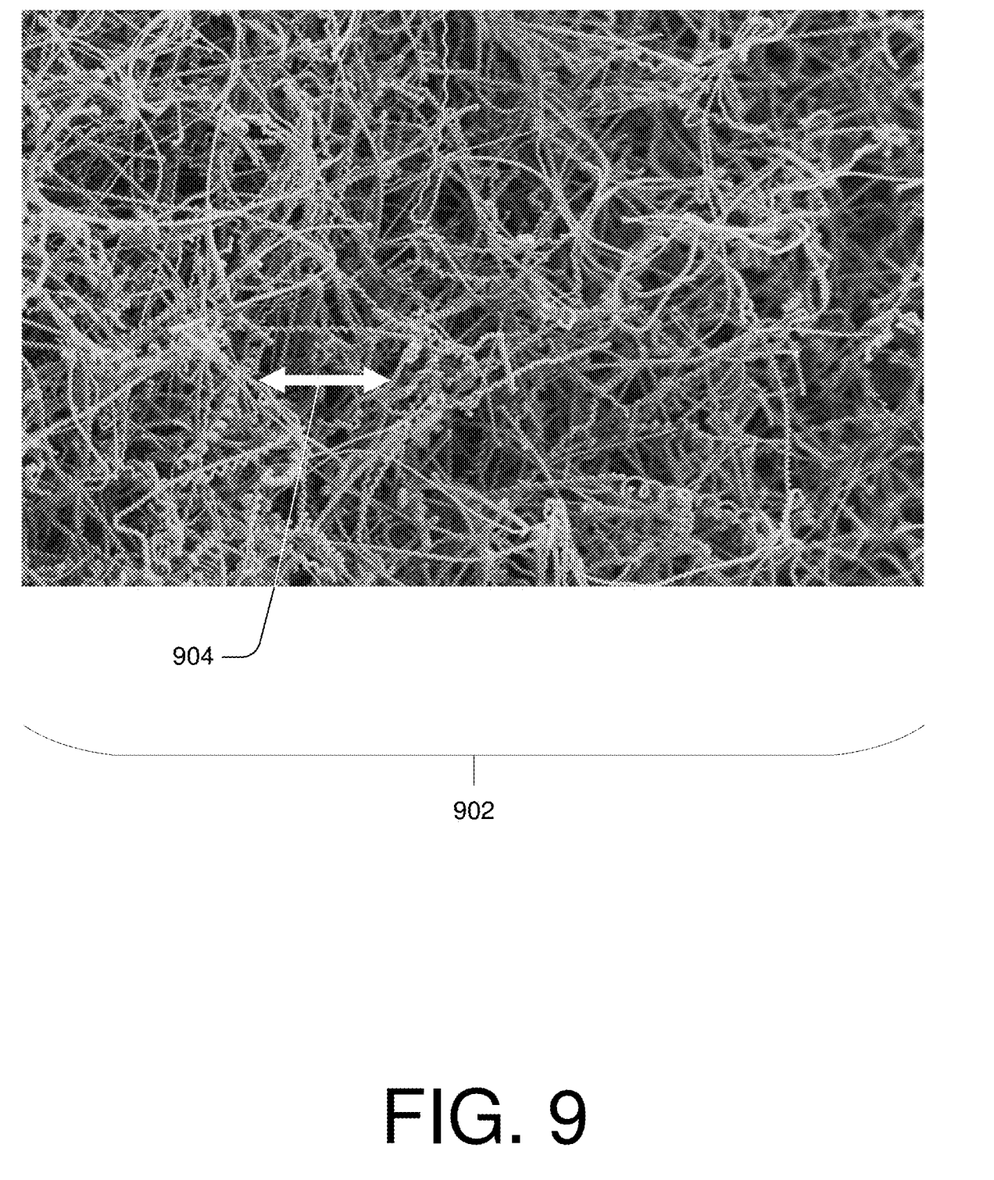
FIGS. 9 and 10 are photographs of the nanosprings mat similar to FIG. 8, at a lower magnification.
Figure 10:
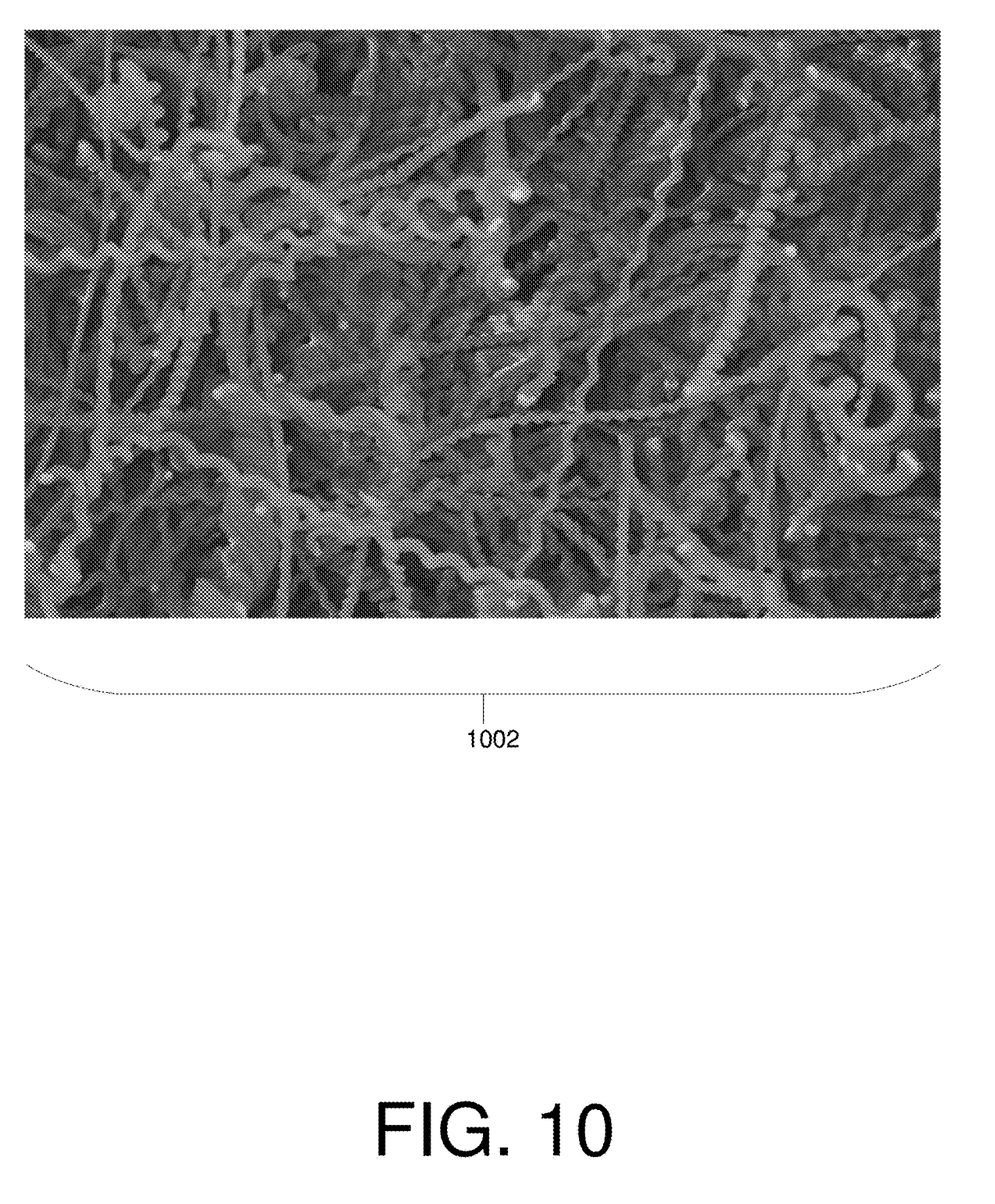

FIG. 9 and FIG. 10 are also photographs of examples of nanosprings mats, showing nanosprings and nanopores.

FIG. 9 is a photograph of a nanosprings mat in which arrow 904 represents 8.8 microns and the length 902 of the photograph represents approximately 61 microns.

FIG. 10 is a photograph of a nanosprings mat. The length 1002 of the photograph represents approximately 24 microns.

In at least one example device, electrolyte is positioned between the two electrodes of the LiB cell. The electrolyte permits the flow of the lithium ions (that is, the flow of electric charge) between the electrodes. In at least a first example, the electrolyte included in the integrated unit is liquid and non-carbonate, and is suspended by van der Waal forces in the interconnected nanopores of the separator scaffold (that it, the nanopores that are not subsumed in the electrode material). In some examples, a non-carbonate liquid electrolyte's concentration is in a range from 0.1 to 1,000 Molar, and the concentration can vary dependent on the battery chemistry. In some examples, the non-carbonate liquid electrolyte solvent can include one or more of γ-Butyrolactone and Methyl Butyrate.

In some examples, the electrolyte can be a solution of lithium hexafluorophosphate ($LiPF_6$), lithium tetrafluoroborate ($LiBF_4$), or lithium bisoxalatoborate ($LiB(C_2O_4)_2$) solution in a carbonate solvent. The electrolyte cannot be lithium bistrifluoromethane sulfonamide ($LiN(CF_3SO_2)_2$). In at least one example, the carbonate solvent is a mixture of ethylene carbonate and diethyl carbonate. In other examples, the carbonate solvent can be ethylene carbonate, propylene carbonate, dimethyl carbonate, ethyl methylcarbonate, diethyl carbonate, or mixtures thereof.

In some examples, a conductive polymer can be used in place of the electrolyte.

Though this disclosure describes at least one example integrated unit that maintains a liquid electrolyte electrostatically in place using nanomaterial, some examples may contain electrolyte that contains gel or air instead of liquid. In some examples, the electrolyte is a polymer gel electrolyte such as poly(ethylene oxide) ("PEO"), poly(acrylonitrile) ("PAN"), poly(methyl methacrylate) ("PMMA"), PVDF, or PVDF and hexafluoropropylene.

Because of its integrated nature that unites a current collector, an electrode, electrolyte, and the separator of the cell, manufacturing the integrated unit eliminates several assembly steps. For example, assembling the integrated unit does not require the assembly of an interface of a membrane and two electrodes because in one example, the integrated unit can be manufactured without at least one of the electrodes that make up a LiB cell, which can be added on to the integrated unit at a later point.

While LiBs are discussed above and below, the integrated unit can also be included in batteries with different chemistries and with different configurations. In some examples, the battery chemistries can be zinc carbon, zinc chloride, alkaline manganese dioxide, silver oxide zinc, zinc-air, nickel-cadmium, nickel-metal hydride, nickel-zinc, nickelhydrogen, and silver oxide. Batteries that are not suitable for this application include thermal batteries, magnesium and aluminum batteries, magnesium/manganese oxide batteries, mercuric oxide batteries, lead acid batteries, and iron electrode batteries.

In some examples, the battery configuration can be a button cell. Additionally, the battery can be configured as part of a system that can deliver energy for extremely long or environmentally severe storage. It is possible that the integrated unit as described herein can also be used in fuel cells. Different chemistries and configurations of batteries may use different separator components.

In some examples, the integrated unit may also include one or more additional components associated with the cell (in addition to the current collector, first electrode, separator, and electrolyte), such as a second electrode.

In some examples, where the first electrode is a cathode, the second electrode is an anode. In some examples, the anode may be connected to the integrated unit as the other electrode using a binder. In some examples, the anode is a graphite anode. Note that as used herein, an "anode" is an electrode through which electrons flow to an outside circuit—through which conventional current flows into an attached electrical device.

In some examples, the integrated unit could be modified for use in a battery cell, wherein the battery cell comprises only a current collector, a separator comprising nanomaterial, and electrolyte, without electrodes.

The innovation described herein aims to mitigate battery failures, increase battery safety, decrease battery assembly costs, and decrease battery capacity loss by stabilizing structural and material integrity under thermal stress, while still retaining the size, shape, and potentiating electrochemical capabilities of the cells currently being manufactured.

Additionally, the innovation described herein permits batteries to maintain electrochemical stability at a much higher temperature than current batteries do, by its incorporation of nanomaterial. In some examples, the device can withstand ambient temperatures of greater than 160° C. When conventional LiBs are used for applications such as aerospace, military, and EDVs, the batteries have to be adapted or special care must be taken for the batteries to withstand high temperatures. A battery pack incorporating the innovation described in this application has a thermal stability range of at least about −80° C. to at most about 200° C. By using nanomaterials as a separator instead of using the membrane of a traditional LiB, as described for at least one example device, the integrated unit allows a battery in which it is placed to operate at a higher temperature range, as well as solving the other problems of using LiBs identified above.

The integrated unit described herein can mitigate consequences of undesired extreme surrounding ambient temperatures in at least three ways. One is that the integrated unit's structural integrity remains at temperatures that degrade conventional separators, which stabilizes internal mechanical barriers. Additionally, the nanomaterial has good heat transfer properties and a capacity to become part of a heat sink mechanism. Moreover, the integrated unit could substantially reduce cathode solid electrolyte interphase ("SEI") impedance by decreasing micro-cracking and degradations, which mitigates internal impedance and diminishes minor and major overheating consequences, thus improving reliability, performance, operational life, costs, and safety.

Increased thermal stability could eliminate the need for external thermal management systems for LiB battery packs. Eliminating the need for the external thermal management system would allow for more economical and streamlined battery packs. External thermal management systems are used, for example, in EDVs and energy storage systems. The current temperature range of a LiB used in an EDV approximately at least around −40° C. to at most about +50° C. If the LiB temperature of existing LiBs in EDVs exceeds +50° C., which can occur in a car sitting in the sun or driving in the sun, it is necessary to use the EDV's external thermal management system to cool the battery pack.

Various configurations of integrated units, and methods for manufacturing the integrated units, are described further with reference to FIGS. 1 to 5.

Illustrative Environment

Figure 1:
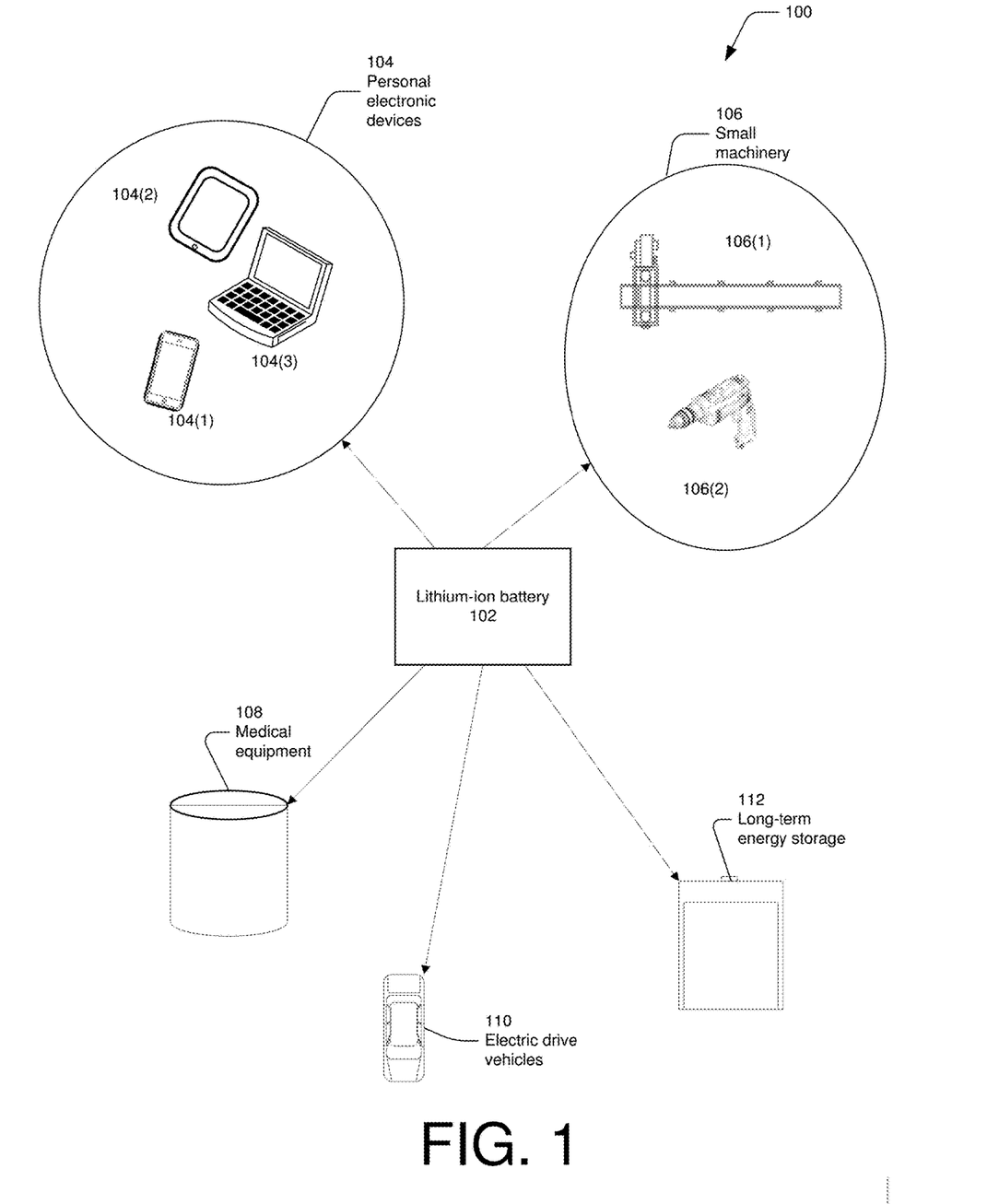
FIG. 1 depicts graphical representations of various example environments in which a battery can be used that incorporates an integrated unit as described herein.

FIG. 1 shows an example environment 100 in which a lithium-ion battery 102 that includes at least one example of an integrated unit described in this disclosure can operate. In the illustrated example, the various devices and/or components of environment 100 that can incorporate lithium-ion batteries ("LiB") include personal electronic device(s) 104(1)-104(N) (individually or collectively referred to herein with reference 104), where N is any integer greater than or equal to 1. Although illustrated as a mobile phone 104(1), a tablet 104(2), and a laptop 104(3), personal electronic devices 102(N) can include a diverse variety of device categories, classes, or types and are not limited to a particular type of device. FIG. 1 also shows that small machinery 106(1)-106(N) (individually or collectively referred to herein with reference 106) can incorporate a LiB including an integrated unit, where N is any integer greater than or equal to 1. Although illustrated as a saw 106(1) and a drill 106(2), small machinery 106(N) can include a diverse variety of device categories, classes, or types and are not limited to a particular type of device. FIG. 1 also illustrates medical equipment 108, EDVs 110, and/or long-term energy storage systems 112 as incorporating a LiB including an integrated unit as described herein.

Figure 2:
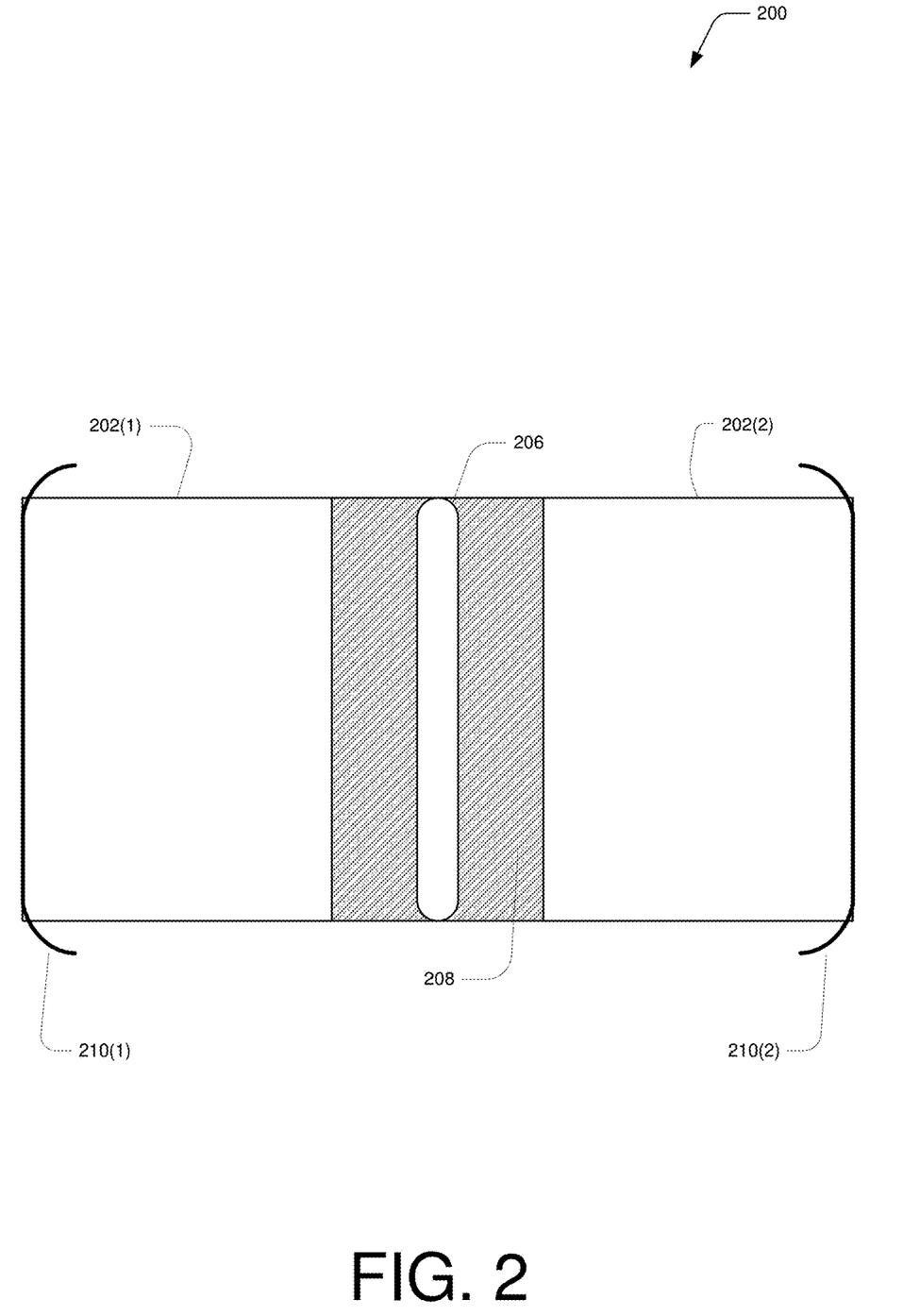
FIG. 2 illustrates a lithium-ion battery cell, which is one type of cell in which an integrated unit as described herein can be used.

FIG. 2 illustrates a LiB battery cell as configured in the prior art. The LiB battery cell can include at least one example of an integrated unit described in this disclosure. FIG. 2 shows that a first electrode 202(1) and a second electrode 202(2) are separated by a separator 206 and electrolyte 208. The first electrode 202(1) is operably connected on the side opposite the separator to a first current collector 210(1). The second electrode 202(2) is operably connected on the side opposite the separator to a second current collector 210(2). During operation of the battery 200, the electrodes 202(1), 202(2) and separator 206 make contact, compressing the separator 206.

Illustrative Integrated Unit Components

Figure 3:
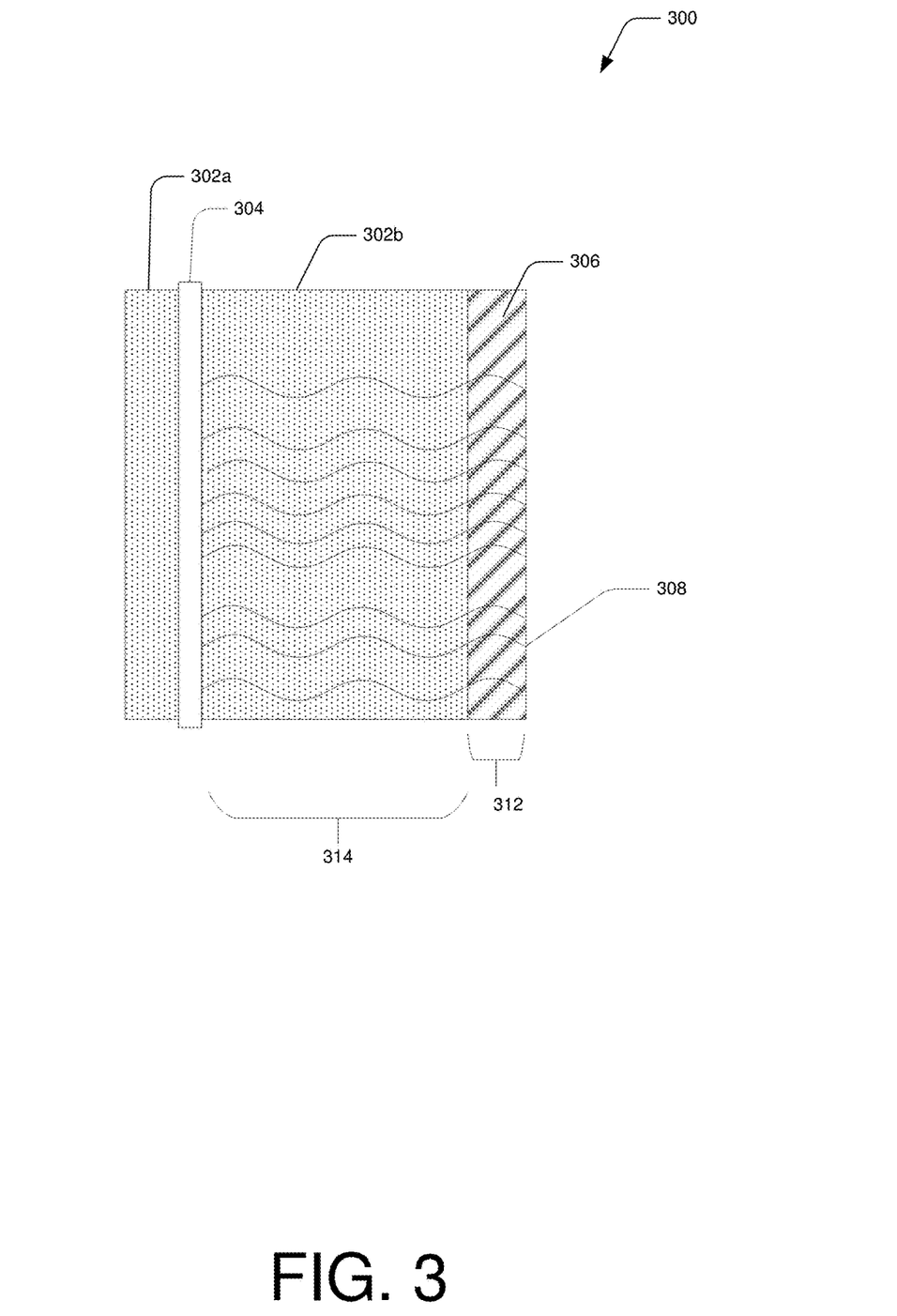
FIG. 3 illustrates an example of an integrated unit.

FIG. 3 illustrates an example of an integrated unit 300 that is the subject of this disclosure. FIG. 3 shows an electrode, in this example a LMO cathode 302a, 302b, on one side of which is electrolyte 306. The current collector 304 grows the nanosprings 308, between which are nanopores. FIG. 6 is a high-magnification photograph that shows the nanosprings with a braided configuration, according to various examples described herein. FIG. 8 is a photograph in which the nanopores and nanosprings are shown, the nanosprings at either end of arrow 802, and the nanopores comprising the space between the nanosprings. The nanosprings outside of the LMO cathode 302a, 302b and nanopores outside of the LMO cathode 302a, 302b together form the separator scaffold. Some of the length 314 of the nanosprings 308 are covered by the LMO cathode 302b. The current collector 304 is, in one example, an aluminum mesh. The mesh current collector 304 allows the LMO cathode 302a, 302b to be pressed through the current collector 304. The electrolyte 306 is electrostatically suspended within the nanopores.

Illustrative Operation

The integrated unit can operate, in at least one example, by inclusion within a LiB. To do so, the integrated unit 300 is connected to a second electrode 202(2) and second current collector 210(2), on the opposite side of the separator scaffold as the first electrode 202(1), and housed within a case (not shown).

Once connected to the second electrode 202(2) and second current collector 210(2), a LiB 200 is formed (FIG. 4, 402) and operates with the same mechanisms as any other LiB.

Where the first electrode (that is, the electrode included in the integrated unit) is a cathode, the second electrode 202(1) is an anode that goes through an oxidation reaction (taking in ions from the electrolyte), creating electrons. The cathode goes through a reduction reaction and absorbs electrons. Electrical charge flows between the electrodes 202(1), 202(2) via the electrolyte 208, and the current collectors 210(1), 210(2) conduct the charge to the outside of the battery and through the load.

Figure 4:
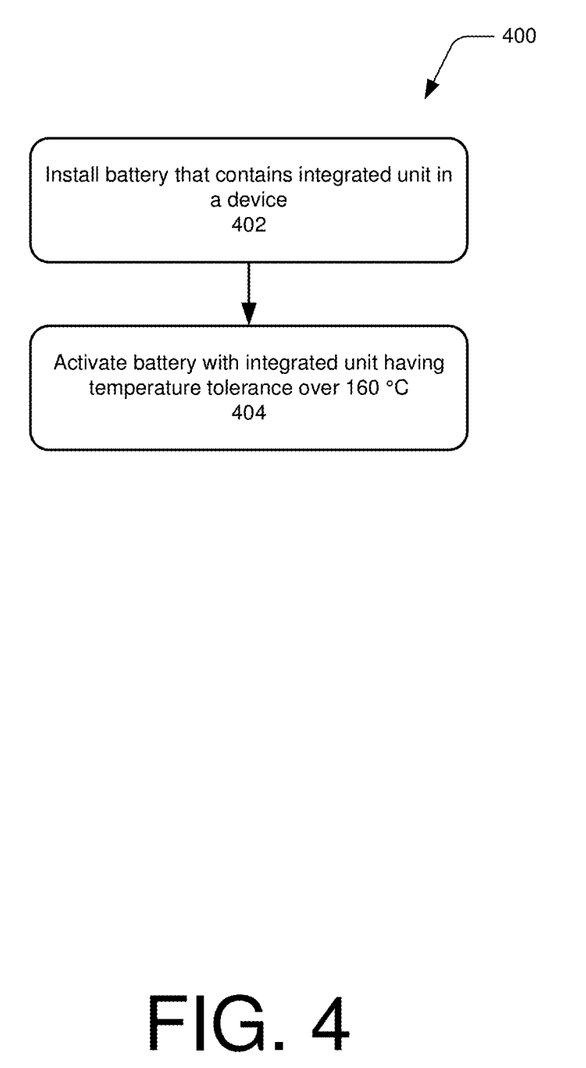
FIG. 4 is a flow diagram of an example method of using an integrated unit according to various examples described herein.

The LiB 200 comprising the integrated unit 300 has a higher temperature tolerance than a conventional LiB, allowing the device into which it is put to operate at higher temperatures (FIG. 4, 404).

Illustrative Process of Manufacture

The process of manufacture of at least one example of an integrated unit of this disclosure is now described.

Figure 5:
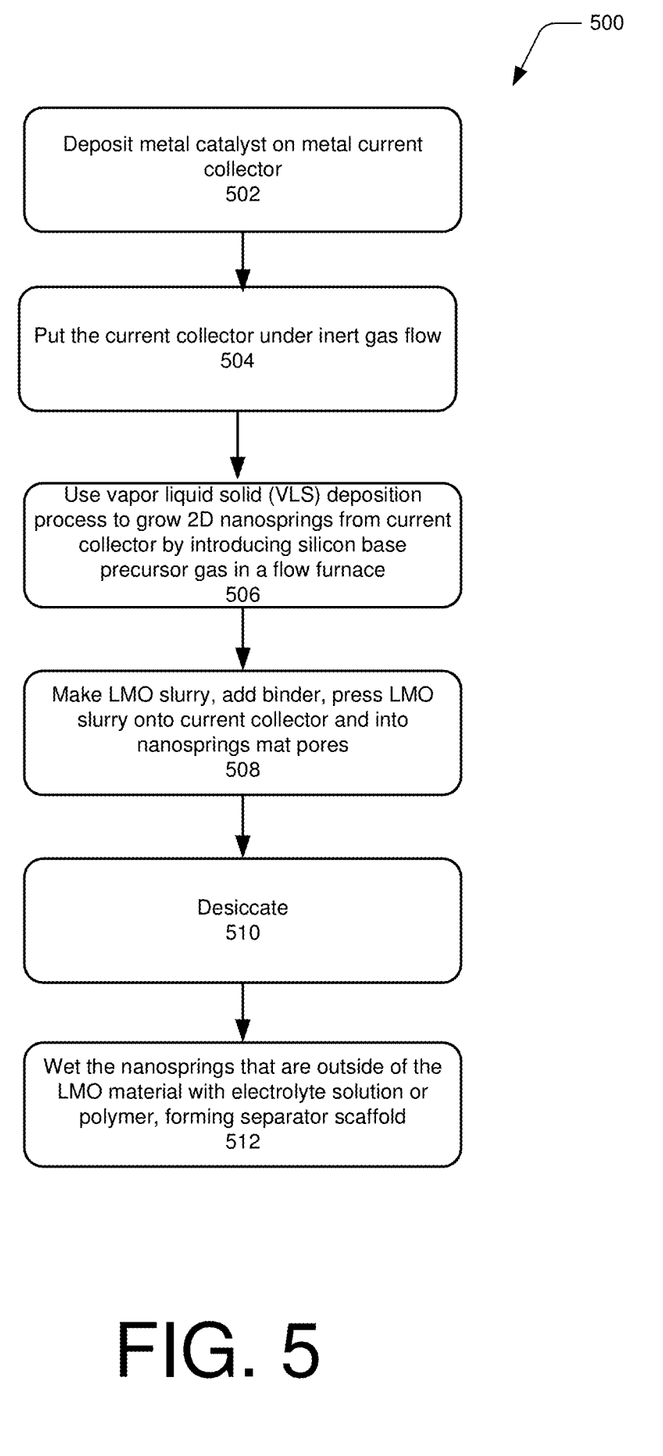
FIG. 5 is a flow diagram of an example method of manufacturing an integrated unit according to various examples described herein.

FIG. 5 is a flow diagram of an example process of manufacture 500 of the integrated unit 300, using a vapor liquid solid ("VLS") process. At 502, in at least one example, a metal catalyst (such as gold) is deposited on the current collector 304 using an electron beam or sputtering deposition method. In some examples, the current collector 304 can be made of any metal.

At step 504, the current collector is placed under inert gas flow, which in some examples can be argon or nitrogen.

At step 506, in at least one example, a vapor deposition process is used to grow 2D nanosprings from the current collector, wherein the nanosprings 308 grow from each location in which the metal catalyst is deposited, and wherein silicon base (or titanium) precursor gas flows in the inert gas.

Step 506 can take, in various examples, between at least about 15 minutes and at most about 8 hours, between at least about 1 hour to at most about 7 hours, or between at least about 3 hours to at most about 6 hours, or until the length of the nanosprings is between at least about 1 micron and at most about 150 microns. The length of the nanomaterial increases as the time increases, to achieve a sufficient length to incorporate all the components of the integrated unit. The heat flow can be measured using differential scanning calorimetry. In various examples of the integrated unit, the heat flow in the LMO half-cell is in a range of from at least about 20 Joules per gram to at most about 500 Joules per gram, or from at least about 20 Joules per gram to at most about 320 Joules per gram, or from at least about 500 Joules per gram to at most about 142,000 Joules per gram.

Once the nanosprings 308 have grown, the nanosprings 308 are atop the current collector 304 with nanopores in between the nanosprings 308. FIG. 8 is a photograph with a magnification at which arrow 802 represents 2.2 microns. Example nanosprings 308 are at each end of the arrow 802. Nanopores are the space in between the nanosprings.

At step 508, a LMO slurry is made as the cathode material and the LMO slurry is pressed onto and through the current collector 304, from the opposite side as the nanosprings 308 are growing. Binder may be added to the LMO slurry to increase or decrease the stickiness of the slurry. In at least one example, the binder PVDF combined with N-Methyl-2-pyrrolidone can be used to increase the stickiness.

The paste of lithiated manganese oxide (spinel) slurry is pressed onto the opposite side of the current collector 304 from the nanosprings mat. In one example, the LMO paste is incorporated into the surface of the current collector 304 and coats the nanomaterial, filling the nanopores. The LMO slurry covers a portion 314 of the length of the nanosprings 308. A portion 312 of the length of the nanosprings 308 is left uncoated. A portion of the LMO slurry is then on each side of the current collector 304. See 302a and 302b. Nanosprings of at least about 2 microns in length and at most about 30 microns in length 312 are left bare, without LMO material covering them.

At step 510, the product is desiccated. At step 512, the length 312 of the nanosprings 308 and the nanopores that are not contained within the slurry are wetted with electrolyte 306 or polymer, for example, poly(methyl methacrylate) ("PMMA"), forming a separator scaffold. Wetting, as used herein, refers to the ability of a liquid to maintain contact with a solid surface, resulting from intermolecular interactions when the two are brought together. In at least one example, liquid electrolyte 306 is placed over the separator scaffold—outside of the cathode material 302a, 302b—and is suspended electrostatically in the nanopores. The electrolyte concentration in some examples is within a range of at least about 0.1 Molar to at most about 1,000 Molar, and the concentration can vary dependent on the battery chemistry.

Thus, approximately at least about 2 microns to at most about 30 microns of nanosprings 308 and nanopores (together forming the separator scaffold) and the electrolyte 306 outside of the cathode 302b comprise the physical separator between the cathode 302a, 302b and an anode 202(2) (a second electrode is not part of integrated unit in some examples).

In some examples, the thickness of the complete integrated unit ranges from at least about 0.1 mm to at most about 3.5 mm.

In some examples, the integrated unit is sealed with binders and the cell is placed in a pouch.

In some examples, electrodes can be stacked. That is, an electrode is placed on the integrated unit, and from that electrode, another integrated unit is built using the same process as described above.

Example Clauses

Clause 1: An integrated electrode-electrolyte unit comprising:

a metal current collector;

nanomaterial comprising a plurality of nanostructures, at least partially bonded to at least one side of the current collector, the nanomaterial further comprising interconnected nanopores between the nanostructures;

an electrode subsuming at least part of the current collector and at least part of the nanostructures and at least part of the nanopores;

a separator scaffold comprising a plurality of nanostructures preventing contact between the electrode and another electrode, the separator scaffold comprising the nanomaterial and nanopores not subsumed within the electrode; and electrolyte disposed between the nanostructures of the separator scaffold.

Clause 2: An integrated unit as clause 1 recites, wherein the nanomaterial includes at least one of nanosprings or nanowires.

Clause 3: An integrated unit as clause 1 or 2 recites, wherein the nanomaterial comprises at least one of a metal, a metal alloy, or a mineral.

Clause 4: An integrated unit as any of clauses 1-3 recites, wherein the nanomaterial comprises one of silicon dioxide or titanium dioxide.

Clause 5: An integrated unit as any of clauses 1-4 recites, wherein the nanopores range in diameter from at least about 0.10 microns to at most about 1.0 microns.

Clause 6: An integrated unit as any of clauses 1-5 recites, wherein the nanomaterial is hydrophobic when the nanomaterial is bare.

Clause 7: An integrated unit as any of clauses 1-6 recites, the electrode composed of a spinel lithiated manganese oxide slurry, wherein the slurry has a viscosity in a range from at least about 0.10 pascal seconds to at most about 200 pascal seconds.

Clause 8: An integrated unit as any of clauses 1-7 recites, wherein the electrode has a thickness of at least about 25 microns to at most about 250 microns.

Clause 9: An integrated unit as any of clauses 1-8 recites, wherein the metal current collector is at least one of metal mesh or metal fabric.

Clause 10: An integrated unit as any of clauses 1-9 recites, wherein the metal current collector has a thickness of at least about 0.01 mm to at most about 0.50 mm.

Clause 11: An integrated unit as any of clauses 1-10 recites, wherein the electrolyte is wettable.

Clause 12: An integrated unit as any of clauses 1-11 recites, wherein the electrolyte includes a gel.

Clause 13: An integrated unit as any of clauses 1-12 recites, wherein the electrolyte includes a liquid.

Clause 14: An integrated unit as any of clauses 1-13 recites, wherein the nanomaterial is connected to both sides of the metal current collector.

Clause 15: An integrated unit as any of clauses 1-14 recites, wherein the electrolyte is in a carbonate solvent.

Clause 16: An integrated unit as any of clauses 1-14 recites, wherein the electrolyte is in a non-carbonate solvent.

Clause 17: A method of manufacturing an integrated electrode-electrolyte unit, the method comprising:
  making a separator of nanomaterial, comprising:
    depositing a liquid metal catalyst onto a metal current collector;
    using vapor deposition process to grow nanosprings from the current collector by introducing a silicon base precursor gas under an inert gas;
  connecting electrode material to the separator, the connecting comprising:
    make a slurry electrode material;
    adjust stickiness of the slurry electrode material by performing at least one of:
      adding binder to the slurry material;
      drying the slurry material;
    attach, at least in part, the current collector to the slurry electrode material by pressing the electrode material onto the current collector, from the opposite side as the nanomaterial is connected to the current collector; and
    coating the nanomaterial outside of the electrode material with electrolyte, wherein the electrolyte is a liquid that is electrostatically disposed between the nanopores of the nanomaterial.

Clause 18: A method as clause 17 recites, the making the separator further comprising coating the nanosprings with a polymer film.

Clause 19: A method as clause 17 or 18 recites wherein the nanosprings are grown for between at least about 15 minutes and at most about 5 hours.

Clause 20: A method as any of clauses 17-19 recites, wherein the method further comprises attaching a second electrode onto the integrated unit on the opposite end of the integrated unit as the first electrode.

Clause 21: A method as clause 20 recites, wherein:
  the electrode is a cathode and the second electrode is an anode; or
  the electrode is an anode and the second electrode is a cathode.

Clause 22: A method as any of clauses 17-21 recites wherein the metal catalyst is at least one of gold, tin, or zinc.

Clause 23: A method as any of clauses 17-22 recites wherein the depositing the metal catalyst onto the metal current collector is performed using electron beam deposition or a sputtering system.

Clause 24: A battery cell comprising:
  a current collector;
  a separator comprising nanomaterial;
  electrolyte; and
  electrodes fully incorporated into the nanomaterial.

Clause 25: A method of using the integrated electrode-electrolyte unit of any of clauses 1-16, the method comprising:
  installing in a device a battery that contains the integrated electrode-electrolyte unit; and
  activating the battery in the device, wherein the device can operate at a temperature higher than 160° C.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc., can be either X, Y, or Z, or a combination thereof.

What is claimed is:

1. An integrated electrode-electrolyte unit comprising:
    a metal current collector;
    nanomaterial comprising:
        a plurality of nanostructures, at least partially bonded to at least one side of the metal current collector; and
        a plurality of interconnected nanopores comprising spaces between individual nanostructures of the plurality of nanostructures;
    an electrode subsuming (1) at least part of the metal current collector, (2) a first portion of the plurality of nanostructures, and (3) a first portion of the plurality of interconnected nanopores between the first portion of the plurality of nanostructures;
    a separator scaffold preventing contact between the electrode and another electrode adjacent to the separator scaffold, the separator scaffold consisting of:
        a second portion of the plurality of nanostructures, wherein the second portion of the plurality of nanostructures is not subsumed within the electrode; and
        a second portion of the plurality of interconnected nanopores between the second portion of the plurality of nanostructures; and
    electrolyte electrostatically suspended in the second portion of the plurality of interconnected nanopores.

2. An integrated unit as claim 1 recites, wherein the nanomaterial comprises at least one of a metal, a metal alloy, or a mineral.

3. An integrated unit as claim 1 recites, wherein the nanomaterial comprises one of silicon dioxide or titanium dioxide.

4. An integrated unit as claim 1 recites, wherein individual nanopores of the plurality of interconnected nanopores range in diameter from at least about 0.10 microns to at most about 1.0 microns.

5. An integrated unit as claim 1 recites, wherein the nanomaterial is hydrophobic when the nanomaterial is bare.

6. An integrated unit as claim 1 recites, the electrode composed of a spinel lithiated manganese oxide slurry, wherein the slurry has a viscosity of at least about 0.10 pascal seconds to at most about 200 pascal seconds.

7. An integrated unit as claim 1 recites, wherein the electrode has a thickness of at least about 25 microns to at most about 250 microns.

8. An integrated unit as claim 1 recites, wherein the metal current collector is at least one of metal mesh or metal fabric.

9. An integrated unit as claim 1 recites, wherein the metal current collector has a thickness of at least about 0.01 mm to at most about 0.50 mm.

10. An integrated unit as claim 1 recites, wherein the electrolyte is wettable.

11. An integrated unit as claim 1 recites, wherein the electrolyte includes a liquid.

12. An integrated unit as claim 11 recites, wherein the electrolyte is in a non-carbonate solvent.

13. An integrated unit as claim 1 recites, wherein the electrolyte includes a gel.

14. An integrated unit as claim 11 recites, wherein the electrolyte is in a carbonate solvent.

15. A method of manufacturing an integrated electrode-electrolyte unit comprising:
    a metal current collector;
    nanomaterial comprising:
        a plurality of nanostructures, at least partially bonded to at least one side of the metal current collector; and
        a plurality of interconnected nanopores comprising spaces between individual nanostructures of the plurality of nanostructures;
    an electrode subsuming (1) at least part of the metal current collector, (2) a first portion of the plurality of nanostructures, and (3) a first portion of the plurality of interconnected nanopores between the first portion of the plurality of nanostructures;
    a separator scaffold preventing contact between the electrode and another electrode adjacent to the separator scaffold, the separator scaffold consisting of:
        a second portion of the plurality of nanostructures, wherein the second portion of the plurality of nanostructures is not subsumed within the electrode; and
        a second portion of the plurality of interconnected nanopores between the second portion of the plurality of nanostructures; and
    electrolyte electrostatically suspended in the second portion of the plurality of interconnected nanopores.

16. A method of manufacturing as claim 15 recites, wherein the nanomaterial comprises at least one of a metal, a metal alloy, or a mineral.

17. A method of manufacturing as claim 15 recites, wherein the nanomaterial comprises one of silicon dioxide or titanium dioxide.

18. A method of manufacturing as claim 15 recites, the electrode composed of a spinel lithiated manganese oxide slurry, wherein the slurry has a viscosity of at least about 0.10 pascal seconds to at most about 200 pascal seconds.

19. A method of manufacturing as claim 15 recites, wherein the electrode has a thickness of at least about 25 microns to at most about 250 microns.

20. A method of manufacturing as claim 15 recites, wherein the metal current collector has a thickness of at least about 0.01 mm to at most about 0.50 mm.

* * * * *